US008766914B2

(12) United States Patent
Malik et al.

(10) Patent No.: US 8,766,914 B2
(45) Date of Patent: Jul. 1, 2014

(54) METHOD AND APPARATUS FOR MEASURING AUDIENCE SIZE FOR A DIGITAL SIGN

(75) Inventors: Shahzad Malik, Ottawa (CA);
Abhishek Ranjan, Toronto (CA);
Philipp J. Hubert, Burlington (CA);
Umesbbhal Patel, Etobicoke (CA);
William J. Colson, Portland, OR (US);
Haroon F. Mirza, Mississauga (CA);
Faizal N. Javer, Toronto (CA)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 13/533,777

(22) Filed: Jun. 26, 2012

(65) Prior Publication Data

US 2013/0342438 A1    Dec. 26, 2013

(51) Int. Cl.
*G09G 5/00*    (2006.01)
(52) U.S. Cl.
USPC ........... 345/156; 345/204; 345/207; 345/212; 345/213
(58) Field of Classification Search
CPC ............. G06F 3/00; G06F 3/005; G06F 3/14; G06F 3/0484; G06F 5/00
USPC .................. 345/156–159, 204–215
See application file for complete search history.

(56) References Cited

U.S. PATENT DOCUMENTS

| | | | |
|---|---|---|---|
| 7,653,213 B2 * | 1/2010 | Longhurst et al. | 382/103 |
| 8,224,023 B2 * | 7/2012 | Greig | 382/103 |
| 2005/0027587 A1 * | 2/2005 | Latona et al. | 705/10 |
| 2005/0028188 A1 | 2/2005 | Latona et al. | |
| 2006/0146046 A1 | 7/2006 | Longhurst et al. | |
| 2007/0097112 A1 | 5/2007 | Greig | |
| 2009/0185784 A1 | 7/2009 | Hiroike et al. | |
| 2009/0245580 A1 * | 10/2009 | Greig | 382/103 |

FOREIGN PATENT DOCUMENTS

KR    1020090084479    8/2009

OTHER PUBLICATIONS

PCT Search Report and Written Opinion, PCT/US2013/043480, Sep. 23, 2013, 10 pages.

* cited by examiner

*Primary Examiner* — Vijay Shankar
(74) *Attorney, Agent, or Firm* — Blakely, Sokoloff, Taylor & Zafman LLP

(57) ABSTRACT

Measuring audience size for a digital sign comprises generating a plurality of paths, one for each face detected in a first sequence of video frames captured by a camera proximate the digital sign, and generating a zone in the sequence of video frames through which passes a threshold number of the paths. Motion and direction of motion within the zone is then measured in a second sequence of video frames to calculate the audience size that passes through the zone in the second sequence of video frames.

25 Claims, 3 Drawing Sheets

METHOD AND APPARATUS FOR MEASURING AUDIENCE SIZE FOR A DIGITAL SIGN

FIELD OF THE INVENTION

Embodiments of the invention relate to a system for measuring audience size for a digital sign.

BACKGROUND

Digital signage is a term that often used to describe the use of an electronic display device, such as a Liquid Crystal Display (LCD), Light Emitting Diode (LED) display, plasma display, or a projected display to show news, advertisements, local announcements, and other media content in public venues such as restaurants or shopping districts.

Targeted advertising helps to identify a potential viewer, and improves advertisers' Return on Investment (ROI) by providing timely and relevant advertisements to the potential viewer. Targeted advertising in the digital signage industry involves digital signs that have the capability to dynamically select and play advertisements according to the potential viewer, and even according to the traits of the potential viewer, passing by in front of the digital signs.

Audience measurement is an important consideration for a digital sign installed at a particular location. Audience measurement provides advertisers with quantifiable data regarding the exposure of their advertising content to viewers, as well as provides Return On Investment (ROI) data for the digital signage operator and advertisers. Two relevant metrics in audience measurement are viewership measurement, which counts the number of individuals that actually viewed, or looked at, the digital sign, and an opportunity-to-see (OTS) measurement, which counts the total number of individuals that passed by the digital sign but did not necessarily view the digital sign. These two values allow advertisers to better understand how many actual views their advertising content receives, as well as provide a measure of the ratio of potential audience size to actual viewers that looked at the digital sign. What is needed is a way to measure viewership and OTS in an automatic, simple, and cost effective manner.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Embodiments of the invention provide a passive and automated audience measurement system for digital signage networks that can be used to provide digital signage operators with quantitative viewership information and return on investment (ROI) data. Embodiments of the invention gather, measure, and analyze video data of individuals passing by a digital sign to improve the advertising ROI of the digital sign.

Embodiments of the invention make use of video image processing and analysis software in estimating the effectiveness of targeting or directing certain advertising on a digital sign comprising a digital display screen or device. By equipping a digital sign with a sensor, such as a front-facing camera proximate the digital display device, and video image software coupled with processors, such as Intel Core I5 and Intel Core I7 processors, digital signs according to an embodiment of the invention have the intelligence to detect the number of viewers ("viewership"), and also calculate the size of the audience or number of people that pass by the digital sign without necessarily or actually viewing an advertisement displayed on the sign. The number of people that pass by the digital sign without viewing the advertisement displayed on the sign is referred to herein as an opportunity-to-see (OTS) count. This viewership and OTS count information can be used to gauge effectiveness of advertisements and adapt advertising ("ad") content accordingly.

Figure 1:
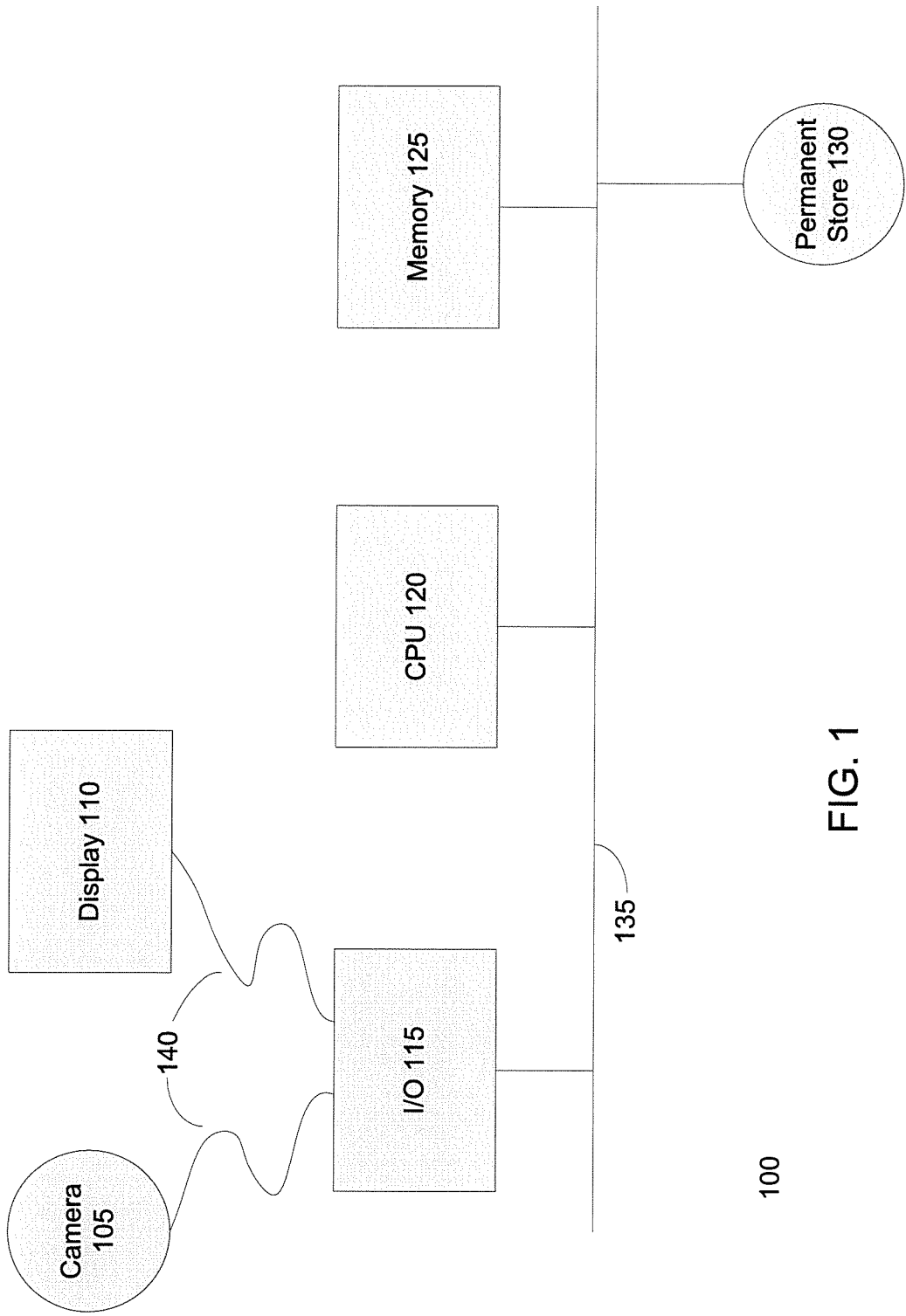
FIG. 1 illustrates in functional block diagram of a computing system utilized in accordance with an embodiment of the invention.
Figure 2:
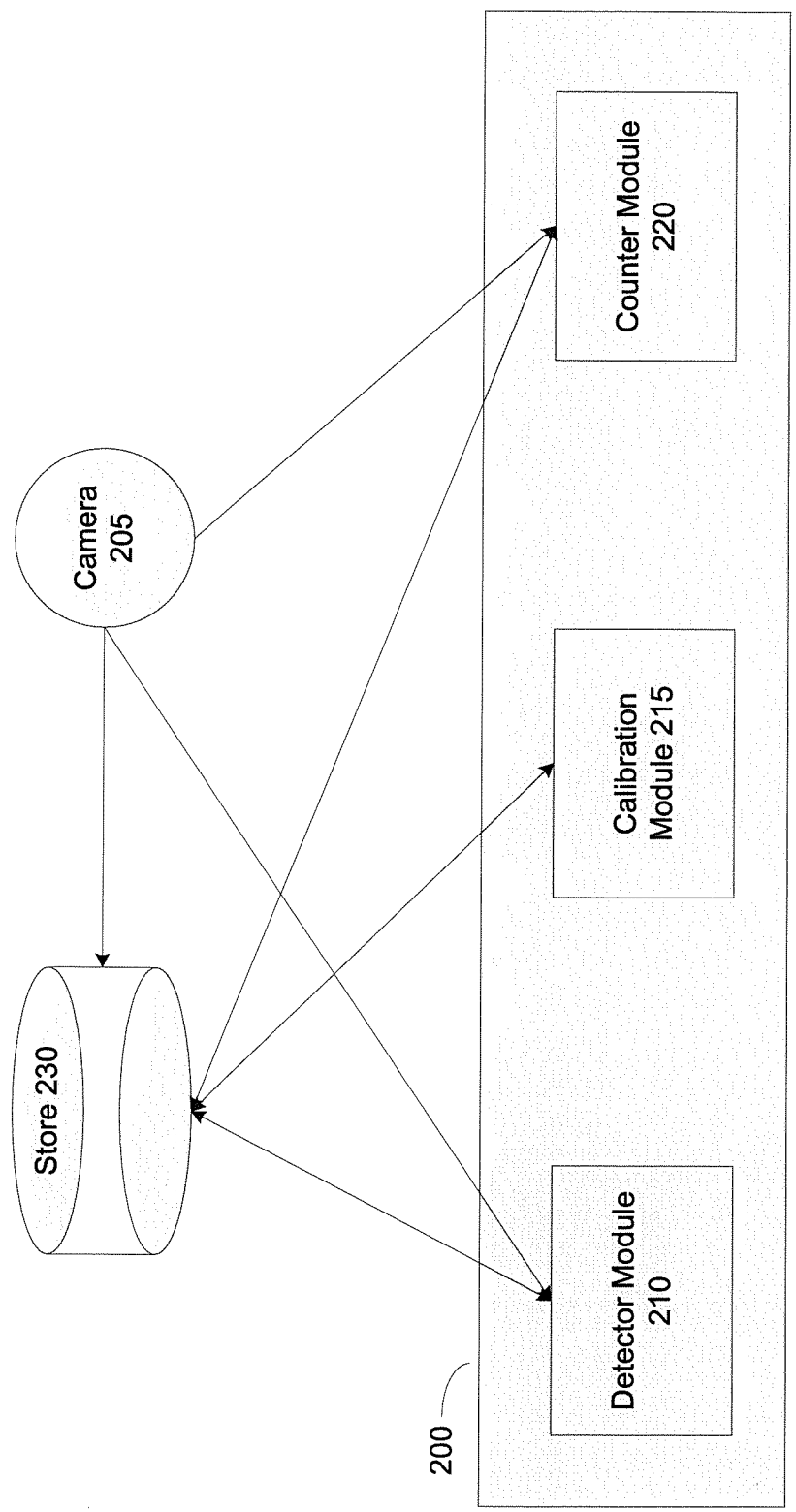
FIG. 2 illustrates a functional block diagram of embodiments of the invention.

With reference to FIGS. 1 and 2, embodiments of the invention comprise a software module 200 that processes a video feed received from a camera 105, 205 to measure viewership and OTS count. In one embodiment, the software module processes the video feed as a real time video feed received directly from camera 105, 205. In another embodiment, the video feed may be stored first in permanent store 130, 230 and later retrieved by software module 200 from permanent store 130, 230 for processing. The software module 200 may itself be stored in permanent store 130, 230 and loaded over bus 135 into memory 125 and executed by CPU 120. Alternatively, the software module may be stored elsewhere, for example, on an application server on the web, so long as it or a user interface to it is accessible for loading and executing by CPU 120. The software can be executed, or run, on a general purpose CPU in a standard computing platform such as platform 100 and an off-the-shelf, standard, operating system. The software module 200 accesses an electronic image capture device, such as camera 105, 205 that in one embodiment is remotely located relative to platform 100 and accessible via input/output interface 115 and a communications link 140. For example, camera 105, 205 may be a web-based camera. Communications link 140 may be any communications link capable of transferring the video feed received from camera 105, 205, such as a local area network (LAN), whether a wired- or wireless-based link. Alternatively, camera 105, 205 may be coupled directly to I/O interface 115 or computer bus 135.

The embodiment illustrated in FIG. 1 contemplates a digital sign display screen 110 ("display 110") also coupled to computing platform 100 via communications link 140 and I/O interface 115. It is appreciated that in other embodiments, the display 110 may be coupled to computing platform 100 via a different communications link, or directly coupled to computing platform 100 via I/O interface 115 or computer bus 135. In yet another embodiment, the display 110 may be connected to, or communicate with, and be controlled by, a different computing platform than computing platform 100 so long as the video feed provided by camera 105, 205, via a computing platform to which it is coupled, to computing platform 100 is used according to an embodiment of the invention as input to measure effectiveness of advertisements and adapt advertising ("ad") content accordingly on display 110. Such an embodiment would involve computing platform 100 and software module 200 executing thereon to communicate with the different computing platform that controls ad content displayed on digital sign display 110.

Figure 3:
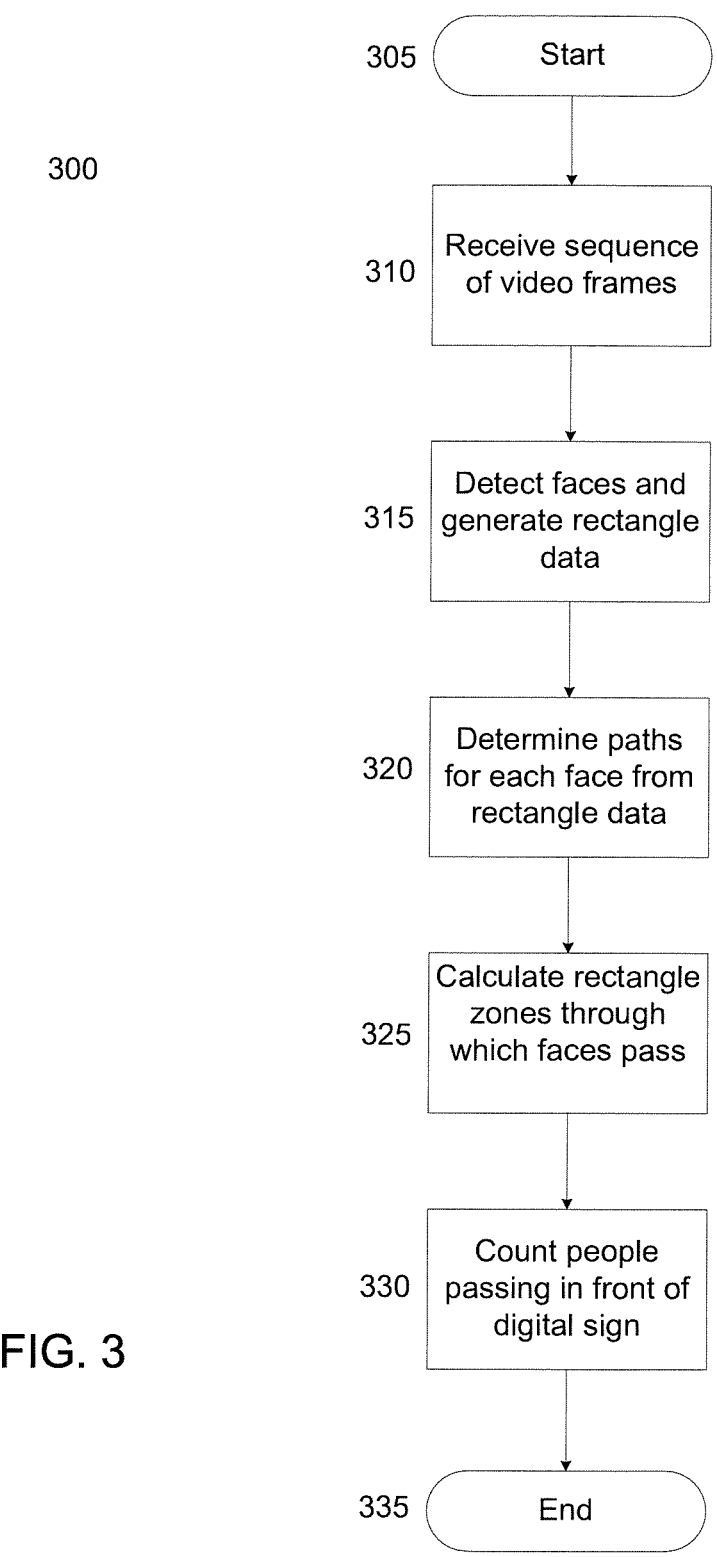
FIG. 3 illustrates a flow diagram of embodiments of the invention.

As illustrated in FIG. 2, software module 200 comprises three functional components or modules: a viewer, or face, detection module 210, an OTS calibration module 215, and an OTS counter module 220. With reference to FIG. 2 and the flow diagram 300 in FIG. 3, an embodiment of the invention operates as follows. The embodiment starts at 305 with camera 105, 205 providing a video feed comprising a sequence of video frames, whether in real-time or time-delayed via permanent store 130, 230. The face detection module 210 receives the sequence of video frames at 310, and at 315 detects faces in the sequence of video frames that are facing, or looking at, the digital sign's display 110. Camera 105, 205 is fixed, or mounted, in one embodiment, in or to the front of display 110, and facing outward, away from display 110, so that the video feed captured by camera 105, 205 captures video of individuals passing by or in front of display 110. In one embodiment, face detection module 210 uses a frontal face detection algorithm to identify faces of individuals that are turned, or facing, toward display 110 and/or toward co-located camera 105, 205.

The face detection module 210 processes the sequence of video frames and generates rectangle data at 315 for each face detected in each processed video frame, according to one embodiment. The rectangle data represents essentially a rectangle surrounding, or framing, the detected face in the video frame. In one embodiment, the rectangle data comprises a picture element (pixel) position of a particular location of, on, or in, the rectangle (e.g., the upper left corner of the rectangle), expressed as an x, y coordinate pair value, and a width and height of the rectangle, expressed in pixels. Face detection module 210 may output this rectangle data to permanent store 230 in one embodiment, until calibration module 215 continues the process at 320. In another embodiment, the rectangle data is maintained in memory 125 and accessed by calibration module 215. Depending on the size or length of the sequence of video frames, face detection module 210 may hold or cache some of the rectangle data in memory 125 while other of the rectangle data may be stored in permanent store 130, 230. As an example, if the video feed generates 30 frames per second, and the video feed is 10 seconds in length, and there are three faces detected in the sequence of video frames, then face detection module 210 generates rectangle data for 900 rectangles.

The process continues at 320 with OTS calibration module 215 receiving the rectangle data generated by face detection module 210. In one embodiment, module 215 receives and processes the rectangle data. This part of the process may occur at some point in time after the rectangle data is compiled, whether immediately or after some period of time, or periodically, depending on such criteria as the date, time of day, memory 125 or storage 130, 230 requirements or limitations of platform 100, or user input, as examples. OTS calibration module 215 determines a plurality of paths, one path for each face detected in the sequence of video frames. Each path is defined by a sequence or set of rectangle data associated with a particular face detected over time in at least a portion of the received sequence of video frames. Calibration module 215 stores this path information in a data structure. In one embodiment, each set of rectangles (represented by the sequence of rectangle data corresponding to the same face detected across the sequence of video frames) representing a path is stored in a separate data structure. For example, the information for each path may be stored in a separate circular queue data structure. These queues may be maintained in memory 125 or may be moved to permanent store 230 in different embodiments of the invention. In the example described above, wherein the video feed generates 30 frames per second, the video feed is 10 seconds in length, and there are three faces detected in the sequence of video frames in the video feed, then each of three circular queue holds path information including rectangle data for 300 rectangles associated with a particular face.

In one embodiment, OTS calibration module 215 is configured to compile or gather a threshold number of paths before the process moves on. For example, module 215 may gather a number of paths based on or limited by the number of separate circular queues allocated to maintain the path information. In another embodiment, a sufficient number of paths are collected to meet a threshold for calibrating the path information, e.g., 100 paths. Once the threshold number of paths is reached, however measured, the process continues at 325. In another embodiment, the process continues at 325 according to predefined time intervals. In any case, at 325, the OTS calibration module 215 receives the paths, for example, from store 230, analyzes the paths, and based on the analysis, calculates a set of optimal rectangular zones in the sequence of video frames through which a threshold number of faces pass in a particular direction. For example, in one embodiment, these rectangular zones represent the most significant areas in the video frame through which the largest number of faces pass in a particular direction (referred to as an "optimal direction" (OD) in the equations and corresponding discussion below). A rectangular zone in one embodiment of the invention is represented simply by an x, y coordinate pair value, for example, a rectangle centered about and x, y value pair located in or around the center of a detected face, or as an x, y coordinate pair value and a width and height of the rectangle, expressed in pixels. (The width and height are referred to as an "optimal width" (OW) and an "optimal height" (OH) in the equations and corresponding discussion below).

In one embodiment, each rectangular zone's associated direction may be in part determined by a set of one or more paths that correspond to a limited or narrow range of rectangle data. This range may be user configurable in one embodiment, or automatically (statistically) determined by OTS calibration module 220 in another embodiment. For example, if two faces are moving in the same direction and same location of the video frame in a sequence of video frames, the paths for those two faces will belong to, or be associated with, the same rectangular zone. If, however, the two faces are generally moving in divergent (e.g., opposite or orthogonal) directions, even if moving within the same general location of the video frame in the sequence of video frames, the faces, and the paths for those two faces, are associated with different rectangular zones. In one embodiment, it is appreciated that there may be up to four or more zones, for example, an east, west, north, and south, zone (or a left, right, up, and down, zone) in the set of rectangular zones.

The set of rectangular zones are stored for later use by OTS counter module 220 at 330 of the process, according to one embodiment of the invention. The counter module 220 receives the set of rectangular zones and a sequence of video frames, whether the same, in whole or part, or a different (e.g., a previous, subsequent, or partially overlapping), sequence of video frames, and estimates the number of people that pass through each zone in the sequence of video frames but do not necessarily look at the digital sign. According to one embodiment, OTS counter module 220 measures the average pixel motion (referred to below as the motion along the x-axis horizontal plane, Mx, and the motion along the y-axis or vertical plane, My) and motion direction (OD) within each zone in the sequence of frames to estimate the number of people that pass through each zone in the sequence of frame but do not necessarily look at the digital sign. In one embodiment, the measurement is performed using well known optical flow techniques or a pixel motion estimation algorithm.

In one embodiment, counter module 220 also measures and adjusts for, or otherwise compensates for, body motion, as opposed to face motion, for those zones having a direction that involves significant body motion. For example, in a zone that involves individuals walking in a direction toward the camera, there is significant body motion in the y-axis or vertical plane. To improve the accuracy of the OTS count in such a zone, the body motion may be accounted for in the measurement of average pixel motion and direction of motion within the zone. In one embodiment, compensation for significant body motion in a particular zone involves configuring a calibrated head-body factor that represents the ratio between body length and face length. In one embodiment, values for the head-body factor range between 6 and 8.

In one embodiment, the equations used to calculate the OTS count for each zone are as follows:

$$\text{Body\_Motion\_Compensation} = |\overrightarrow{OD} \cdot (\overrightarrow{0,1})| * (\text{Calibrated\_Head\_Body\_Factor} - 1) + 1$$

wherein the result of the body motion compensation calculation for a particular zone (in this example, in a zone having a y-axis or vertical direction) is used in calculating an "Increment" for the same zone as set forth below:

$$\text{Increment} = \frac{\frac{\sqrt{(Mx^2 + My^2)}}{\sqrt{(OH^2 + OW^2)}} * |\overrightarrow{D} \cdot \overrightarrow{OD}|}{\text{Body\_Motion\_Compensation}}$$

If the result in the equation above, that is, if the Increment for a given zone is greater than zero, then the OTS count for that zone is incremented by the value of Increment. If, however, Increment is equal to or less than zero, then OTS count remains unchanged. Stated another way:

```
If Increment > 0 then
    New_OTS = Old__OTS + Increment
else
    New_OTS = Old_OTS.
```

The above equation provides a boundary condition to ensure that if motion is heading in an opposite direction then the OTS count is not "incremented" to avoid a situation where the OTS count becomes a negative value.

As described above, embodiments of the invention calibrate the zones within a sequence of video frames. Once the zones have been calibrated, the OTS counter module 220 determines pixel motion within each zone to estimate OTS counts. Embodiments of the invention result in higher accuracy OTS counts and lower overall CPU utilization due to 1) the fact that viewership and motion information gathered by calibration module 215 allows embodiments of the invention to determine optimal zones, or search regions, which eases the video processing algorithms, 2) the counter module 220 operation relying on pixel motion rather than complicated image segmentation or tracking, resulting in a more efficient solution that is less prone to light changes or shadows, and 3) the calibration of the optimal zones is continuous, allowing embodiments of the invention to dynamically adapt to the environment at or in front of the digital sign's display 110 if, for example, movement patterns of individuals change in that location change.

The following examples pertain to further embodiments of the invention.

One embodiment of the invention provides a method for measuring audience size for a digital sign, comprising, generating a plurality of paths, one for each face detected in a first sequence of video frames captured by a camera proximate the digital sign, generating a zone through which passes a threshold number of the paths in the first sequence of video frames, and measuring motion and direction of motion within the zone in a second sequence of video frames to calculate the audience size that passes through the zone in the second sequence of video frames. One embodiment further comprises detecting the faces in the first sequence of video frames captured by the camera proximate the digital sign and generating, for each detected face in each video frame in the first sequence of video frames, rectangle data, wherein generating the plurality of paths for each detected face comprises generating a path for each detected face based on the rectangle data. In one embodiment, detecting the faces in the first sequence of video frames comprises detecting faces that face the digital sign in the first sequence of video frames, wherein a frontal face detection algorithm is used to detect those faces that face the digital sign in the first sequence of video frames.

According to one embodiment, the rectangle data generated for a particular detected face represents a rectangle that frames the detected face, the rectangle data comprising a picture element (pixel) position of a location of the rectangle framing the detected face, the pixel position of the location expressed as an x, y coordinate pair value, and a width and height of the rectangle, each expressed as a number of pixels. In one embodiment of the invention, the path generated for each detected face based on the rectangle data is defined by a set of rectangle data associated with a particular detected face over at least a portion of the first sequence of video frames. Generating a path for each detected face, in one embodiment, comprises storing the set of rectangle data associated with the particular detected face that defines the path in a separate data structure.

In one embodiment of the invention, generating a zone in the first sequence of video frames through which passes a threshold number of the paths comprises analyzing the plurality of paths and generating therefrom a rectangular zone in the sequence of video frames through which a threshold number of faces pass in a general direction of motion. The rectangular zone is represented by a direction of motion, a picture element (pixel) position of a location in the rectangular zone, the pixel position expressed as an x, y coordinate pair value, and a width and height of the rectangular zone, each expressed as a number of pixels.

According to one embodiment, in connection with measuring motion and direction of motion within the zone in a second sequence of video frames to calculate the audience size that passes through the zone in the second sequence of video frames, the second sequence of video frames comprises at least a portion of the first sequence of video frames. In one embodiment, measuring motion and direction of motion within the zone in the second sequence of video frames comprises measuring average pixel motion and direction of motion within the zone according to a pixel motion estimation algorithm. In one embodiment, measuring motion and direction of motion within the zone in the second sequence of video frames comprises measuring and compensating for body motion within the zone in the second sequence of video frames.

In one embodiment, at least one machine readable medium comprises a plurality of instructions that in response to being executed on a computing device, cause the computing device to perform any combination of the limitations set forth above in the variously enumerated embodiments.

According to one embodiment, an apparatus to measure audience size for a digital sign, comprises a processor, a memory coupled to the processor, a face detection module including machine instructions that when loaded from memory and executed by the processor generate a plurality of paths, one for each face detected in a first sequence of video frames captured by a camera proximate the digital sign, a calibration module including machine instructions that when loaded from memory and executed by the processor generate a zone in the first sequence of video frames through which passes a threshold number of the paths, and a counter module including machine instructions that when loaded from memory and executed by the processor measure motion and direction of motion within the zone in a second sequence of video frames to calculate the audience size that passes through the zone in the second sequence of video frames. In one embodiment, the face detection module includes further machine instructions that when loaded from memory and executed by the processor detect the faces in the first sequence of video frames captured by the camera proximate the digital sign. The face detection module also may generate for each video frame rectangle data for each detected face. The face detection module, in one embodiment, generates the plurality of paths for each detected face comprises the face detection module to generate a path for each detected face based on the rectangle data. In one embodiment, the face detection module that detects the faces using a frontal face detection algorithm, that face the digital sign in the first sequence of video frames captured by the camera positioned in front of the digital sign.

According to one embodiment, the rectangle data represents a rectangle framing the detected face, the rectangle data comprising a picture element (pixel) position of a location of the rectangle framing the detected face, the pixel position of the location expressed as an x, y coordinate pair value, and a width and height of the rectangle, each expressed as a number of pixels. The face detection module generates a path for each detected face, the path defined by a set of rectangle data associated with the face detected over at least a portion of the first sequence of video frames. In one embodiment, the face detection module maintains the set of rectangle data associated with each detected face that defines the path in a separate circular queue-based data structure.

According to one embodiment, the calibration module that generates a zone in the first sequence of video frames through which passes a threshold number of the paths analyzes the plurality of paths and generates a rectangular zone in the first sequence of video frames through which a threshold number of faces pass in a particular direction of motion based on the analysis.

CONCLUSION

In this description, numerous details have been set forth to provide a more thorough explanation of embodiments of the invention. It should be apparent, however, to one skilled in the art, that embodiments of the invention may be practiced without these specific details. In other instances, well-known structures and devices have been shown in block diagram form, rather than in detail, in order to avoid obscuring embodiments of the invention.

Some portions of this detailed description are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of invention also relate to apparatuses for performing the operations herein. Some apparatuses may be specially constructed for the required purposes, or may comprise a general purpose computer selectively activated or configured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. The required structure for a variety of these systems appears from the description herein. In addition, embodiments of the invention are not described with reference to any particular programming language. It will be appreciated that a variety of programming languages may be used to implement the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the embodiment of the invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that recite only those features regarded as essential to the invention.

What is claimed is:

1. An apparatus to measure audience size for a digital sign, comprising: a processor; a memory coupled to the processor; a face detection module including machine instructions that when loaded from memory and executed by the processor generate a plurality of paths, one for each face detected in a first sequence of video frames captured by a camera proximate the digital sign; a calibration module including machine instructions that when loaded from memory and executed by the processor generate a zone in the first sequence of video frames through which passes a threshold number of the paths; and a counter module including machine instructions that when loaded from memory and executed by the processor measure motion and direction of motion within the zone in a second sequence of video frames to calculate the audience size that passes through the zone in the second sequence of video frames;

wherein the counter module to measure motion and direction of motion within the zone in the second sequence of video frames comprises the counter module to measure average pixel motion and direction of motion within the zone, according to a pixel motion estimation algorithm.

2. The apparatus of claim 1, further comprising:
the face detection module including further machine instructions that when loaded from memory and executed by the processor detect the faces in the first sequence of video frames captured by the camera proximate the digital sign; and
the face detection module including further machine instructions that when loaded from memory and executed by the processor generate for each video frame rectangle data for each detected face, and wherein the face detection module to generate the plurality of paths for each detected face comprises the face detection module to generate a path for each detected face based on the rectangle data.

3. The apparatus of claim 2, wherein the face detection module to detect the faces in the first sequence of video frames captured by the camera proximate the digital sign comprises the face detection module to detect faces, using a frontal face detection algorithm, that face the digital sign in the first sequence of video frames captured by the camera positioned in front of the digital sign.

4. The apparatus of claim 2, wherein the rectangle data represents a rectangle framing the detected face, the rectangle data comprising a picture element (pixel) position of a location of the rectangle framing the detected face, the pixel position of the location expressed as an x, y coordinate pair value, and a width and height of the rectangle, each expressed as a number of pixels.

5. The apparatus of claim 2, wherein the face detection module to generate a path for each detected face based on the rectangle data comprises the face detection module to generate a path for each detected face, the path defined by a set of rectangle data associated with the face detected over at least a portion of the first sequence of video frames.

6. The apparatus of claim 5, wherein the face detection module to generate a path for each detected face comprises the face detection module to maintain the set of rectangle data associated with each detected face that defines the path in a separate circular queue-based data structure.

7. The apparatus of claim 1, wherein the calibration module to generate a zone in the first sequence of video frames through which passes a threshold number of the paths comprises the calibration module to analyze the plurality of paths and generate a rectangular zone in the first sequence of video frames through which a threshold number of faces pass in a particular direction of motion based on the analysis.

8. The apparatus of claim 1, wherein the second sequence of video frames comprises at least a portion of the first sequence of video frames.

9. The apparatus of claim 1, wherein the counter module to measure motion and direction of motion within the zone in a second sequence of video frames comprises the counter module to measure and compensate for body motion within the zone in the second sequence of video frames.

10. At least one machine readable medium comprising a plurality of instructions that in response to being executed on a computing device, cause the computing device to: generate a plurality of paths, one for each face detected in a first sequence of video frames captured by a camera proximate the digital sign; generate a zone in the first sequence of video frames through which passes a threshold number of the paths; and measure motion and direction of motion within the zone in a second sequence of video frames to calculate the audience size that passes through the zone in the second sequence of video frames;

wherein to measure motion and direction of motion within the zone in the second sequence of video frames comprises to measure average pixel motion and direction of motion within the zone, using a pixel motion estimation algorithm.

11. The at least one machine readable medium of claim 10, further comprising instructions that in response to being executed on a computing device, cause the computing device to:

detect the faces in the first sequence of video frames captured by the camera proximate the digital sign; and
generate for each video frame rectangle data for each detected face, and wherein to generate the plurality of paths for each detected face comprises to generate a path for each detected face based on the rectangle data.

12. The at least one machine readable medium of claim 11, wherein to detect the faces in the first sequence of video frames comprises to detect faces, using a frontal face detection algorithm, that look toward the digital sign in the first sequence of video frames captured by the camera positioned in front of the digital sign.

13. The at least one machine readable medium of claim 11, wherein to generate a path for each detected face based on the rectangle data comprises to generate a path for each detected face, the path defined by a set of rectangle data associated with the face detected over at least a portion of the first sequence of video frames.

14. The at least one machine readable medium of claim 10, wherein to generate a zone in the first sequence of video frames through which passes a threshold number of the paths comprises to analyze the plurality of paths and generate based thereon a rectangular zone in the first sequence of video frames through which a threshold number of faces pass in a particular direction of motion.

15. The at least one machine readable medium of claim 10, wherein to measure motion and direction of motion within the zone in a second sequence of video frames comprises to measure for body motion within the zone in the second sequence of video frames and adjust the measure of motion accordingly.

16. A method for measuring audience size for a digital sign, comprising: generating a plurality of paths, one for each face detected in a first sequence of video frames captured by a camera proximate the digital sign; generating a zone through which passes a threshold number of the paths in the first sequence of video frames; and measuring motion and direction of motion within the zone in a second sequence of video frames to calculate the audience size that passes through the zone in the second sequence of video frames;

wherein measuring motion and direction of motion within the zone in the second sequence of video frames comprises measuring average pixel motion and direction of motion within the zone according to a pixel motion estimation algorithm.

17. The method of claim 1, further comprising:
detecting the faces in the first sequence of video frames captured by the camera proximate the digital sign; and
generating, for each detected face in each video frame in the first sequence of video frames, rectangle data, and wherein generating the plurality of paths for each detected face comprises generating a path for each detected face based on the rectangle data.

18. The method of claim 17, wherein detecting the faces in the first sequence of video frames comprises detecting faces that face the digital sign in the first sequence of video frames, wherein a frontal face detection algorithm is used to detect those faces that face the digital sign in the first sequence of video frames.

19. The method of claim 17, wherein the rectangle data generated for a particular detected face represents a rectangle that frames the detected face, the rectangle data comprising a picture element (pixel) position of a location of the rectangle framing the detected face, the pixel position of the location expressed as an x, y coordinate pair value, and a width and height of the rectangle, each expressed as a number of pixels.

20. The method of claim 17, wherein the path generated for each detected face based on the rectangle data is defined by a set of rectangle data associated with a particular detected face over at least a portion of the first sequence of video frames.

21. The method of claim 20, wherein generating a path for each detected face comprises storing the set of rectangle data associated with the particular detected face that defines the path in a separate data structure.

22. The method of claim 1, wherein generating a zone in the first sequence of video frames through which passes a threshold number of the paths comprises analyzing the plurality of paths and generating therefrom a rectangular zone in the sequence of video frames through which a threshold number of faces pass in a general direction of motion.

23. The method of claim 22, wherein the rectangular zone is represented by a direction of motion, a picture element (pixel) position of a location in the rectangular zone, the pixel position expressed as an x, y coordinate pair value, and a width and height of the rectangular zone, each expressed as a number of pixels.

24. The method of claim 1, wherein the second sequence of video frames comprises at least a portion of the first sequence of video frames.

25. The method of claim 1, wherein measuring motion and direction of motion within the zone in the second sequence of video frames comprises measuring and compensating for body motion within the zone in the second sequence of video frames.

* * * * *